United States Patent [19]
Chaffin, III

[11] 3,716,845
[45] Feb. 13, 1973

[54] OPTICAL MEMORY WITH INTERFEROMETER TRACKING

[75] Inventor: John H. Chaffin, III, Minnetonka, Minn.

[73] Assignee: Honeywell Inc., Minneapolis, Minn.

[22] Filed: March 9, 1972

[21] Appl. No.: 233,201

[52] U.S. Cl. ..340/173 LM, 340/173 LT, 356/106 R, 356/110, 340/174.1 C
[51] Int. Cl. .........G11c 7/00, G11c 13/04, G03b 5/02
[58] Field of Search ..340/173 LT, 173 LM, 174.1 C; 356/106 R, 110

[56] References Cited

UNITED STATES PATENTS

| | | | |
|---|---|---|---|
| 3,638,185 | 1/1972 | Dell et al. | 340/173 LT |
| 3,084,334 | 4/1963 | Martin et al. | 340/173 LT |
| 3,551,055 | 12/1970 | Chitayat | 356/110 |

OTHER PUBLICATIONS

Beaudouin et al.; Optical Path Length Compensator, 12/70, IBM Technical Disclosure Bulletin, Vol. 13 No. 7, pp. 1921–1922
Courselle, Electronic Fringe Counter, 8/66, IBM Technical Disclosure Bulletin, Vol. 9 No. 3, pp. 269–271
Cook et al.; An Automatic Fringe Counting Interferometer for Use in the Calibration of Line Scales, 1/31/61, Journal of Research of the National Bureau of Standards –C. Engineering and Instrumentation, Vol. 65C, No. 2, 4/61–6/61 pp. 129–140

*Primary Examiner*—Bernard Konick
*Assistant Examiner*—Stuart Hecker
*Attorney*—Lamont B. Koontz et al.

[57] ABSTRACT

An optical mass memory utilizing a rotatable substrate is provided with improved tracking. An interferometer measures the distance between a reflective edge surface on the rotatable substrate and a reflective surface on a movable arm. The final lens for focusing the read-write light beam to a focused light spot on the memory medium is mounted on the movable arm. The electrical signal produced by the interferometer is compared to a track selection signal which is indicative of the desired distance between the reflective edge surface and the reflective surface, and a servo control signal is produced which is indicative of the difference of the electrical signal and the track selection signal. The movable arm is positioned in response to the servo control signal.

5 Claims, 11 Drawing Figures

OPTICAL MEMORY WITH INTERFEROMETER TRACKING

BACKGROUND OF THE INVENTION

The present invention is directed to an optical memory and in particular to a memory in which information is stored on a memory medium attached to a rotatable substrate.

The ever increasing needs for the storage of large quantities of data in modern computer systems have required the development of new techniques for information storage. Optical techniques permit high density information storage greater than that attainable with conventional magnetic recording. Other advantages of an optical mass memory include a reduction in mechanical complexity and power consumption over previous large capacity memories, the reduction of mechanical wear and damage associated with read-write heads contacting the storage medium, and high speed addressing of information in the memory.

A highly advantageous optical information storage scheme utilizes a laser to provide Curie point writing on a ferromagnetic medium. Such a scheme was disclosed and claimed in a U.S. Pat. No. 3,368,209 to L. D. McGlauchlin et al. and is assigned to the same assignee as the present invention. Utilizing manganese bismuth (MnBi) as the ferromagnetic medium in a Curie point writing system, packing densities of $2.34 \times 10^7$ bits / $cm^2$ have been demonstrated.

In optical mass memories having extremely high packing densities, it is necessary that highly accurate beam positioning or "tracking" be achieved. This is necessary to insure that the beam is accurately positioned with respect to an information bit during the writing, reading, and erasing stages of operation.

In particular, in an optical mass memory in which the memory medium is attached to a rotatable substrate such as a disc or a drum, the information bits are stored in a series of parallel tracks. In one proposed optical mass memory, in which manganese bismuth film is the memory medium, the information bits are approximately 1 micron in diameter and the tracks are separated by 3 microns or less.

One method of achieving the accurate beam positioning required for an optical memory utilizes magnetically written or burned tracking spots on the memory medium at the beginning of each track. The light beam is repeatedly scanned across the tracking spot and the optical signal produced is used to position the light beam on the track. This system has several shortcomings. First, the accuracy of positioning is dependent upon the signal available from the tracking spots. In the case of an optical memory, the error signal due to beam-to-track misregistry is very low. Second, the positioning is disasterously influenced by non-writeable areas on the memory medium.

SUMMARY OF THE INVENTION

With the present invention, improved tracking in an optical mass memory is achieved. Tracking is independent of the memory medium.

A memory medium is attached to a rotatable substrate having a memory surface and a reflective edge surface essentially normal or orthogonal to the memory surface. Movable arm means extend over the memory surface. Final lens means for focusing the read-write light beam to a focused light spot on the memory medium is attached to the movable arm means. A reflective surface is also attached to the movable arm means.

Improved tracking is achieved by the use of interferometer means which measures the distance between the reflective edge surface and the reflective surface. The measurement is independent of the memory medium. The electrical signal produced by the interferometer means, which is indicative of the distance measured by the interferometer means, is compared to a track selection signal which is indicative of the desired distance between the reflective edge surface and the reflective surface. A servo control signal is produced which is indicative of the difference of the electrical signal and the track selection signal. The movable arm means is positioned in response to the servo control signal.

DETAILED DESCRIPTION OF THE PREFERRED EMBODIMENTS

Figure 1:
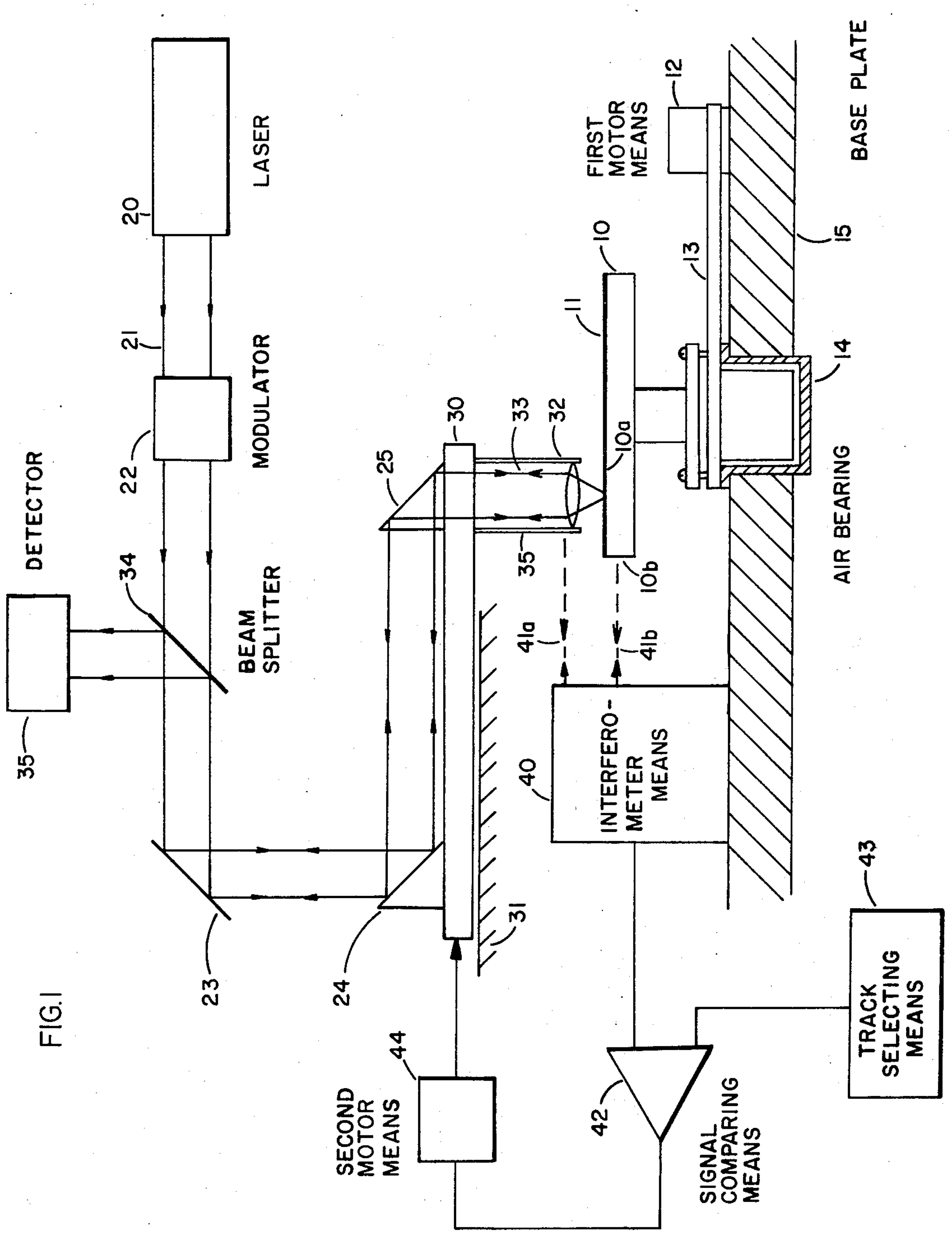
FIG. 1 shows an optical mass memory having an improved tracking system of the present invention.

In FIG. 1 is shown an optical memory including the improved tracking system of the present invention. A rotatable substrate 10 has a memory surface **10*a* and a reflective edge surface 10*b* which is essentially orthogonal to memory surface 10*a*. In particular, a circular disc substrate having a planar memory surface and a curved edge surface is shown. However, it is understood that the rotatable substrate could comprise a cylindrical drum substrate rather than a circular disc. Memory medium 11, which is attached to memory surface 10*a***, is preferably a magnetic material such as manganese bismuth film. However, other memory materials well known in the art such as photochromic materials may also be used.

First motor means 12 causes rotation of the substrate by means of belt 13. Although belt 13 is specifically shown, it is understood that a variety of means by which first motor means 12 causes rotation of substrate 10 are available. Air bearing 14, which is mounted in base plate 15 provides relatively frictionless rotation of substrate 10.

A light source such as laser 20 produces light beam 21 which is used for reading, writing, and erasing on memory medium 11. Modulator 22 controls the intensity of light beam 21. Light beam 21 is directed to memory medium 11 by mirror 23 and prisms 24 and 25. Mirror 23 and prisms 24 and 25 are mounted to movable arm means 30, which extends over the memory surface. Movable arm means 30 is capable of motion in a direction essentially parallel to memory surface 10*a* and essentially orthogonal to the reflective edge surface 10*b*. In the case of a circular disc substrate such as shown in FIG. 1, movable arm means 30 is capable of motion in a radial direction with respect to the circular disc substrate. Movable arm means 30 is mounted on air slide mount 31, thus providing a low friction system. Air slide mount 31 is rigidly positioned and connected to base plate 15.

The final lens means 32 focuses light beam 21 to a focused light spot on memory medium 11. Final lens means 32 is held by final lens mounting means 33, which is attached to movable arm means 30. It can be seen that the particular track of bits being written, read, or erased depends upon the position of movable arm means 30. Readout of the information stored on memory medium 11 is achieved by using the reflected portion of light beam 21. As shown in FIG. 1, light beam 21 is directed normal to the memory medium 11, and therefore light beam 21 is reflected back over essentially the same path. Beam splitter 34 directs a portion of the reflected beam to detector 35. When memory medium 11 is a magnetic film such as MnBi, the Kerr magneto-optic effect is utilized for readout.

The extremely precise tracking required for an optical mass memory is achieved by use of interferometer means 40, which measures the relative distance between reflective edge surface 10*b* and a reflective surface 35, which is attached to movable arm means 30. As shown in FIG. 1, reflective surface 35 may comprise a portion of final lens mounting means 33. However, it should be understood that a separate reflective surface attached to movable arm means 30 may also be used. Interferometer means 40 directs light beam 41*a* to reflective surface 35 and light beam 41*b* to reflective edge surface 10*b*. Light beams 41*a* and 41*b* are reflected back to interferometer means 40, where they are combined to form an interference fringe pattern. The fringe pattern is disected and monitored and an electrical signal is produced which is indicative of the distance between reflective edge surface 10*b* and reflective surface 35. The electrical signal produced by interferometer means 40 is directed to signal comparing means 42, which may, for example, comprise a differential amplifier. Track selecting means 43 produces a track selection signal which is indicative of the desired distance between reflective edge surface 10*b* and reflective surface 35. The track selection signal is directed to signal comparing means 42, which produces a servo control signal which is indicative of the difference of the electrical signal produced by the interferometer means 40 and the track selection signal produced by track selecting means 43. The servo control signal is directed to second motor means 44 which positions movable arm means 30 in the direction essentially orthogonal to reflective edge surface 10*b*. Second motor means 44 may comprise, for example, a direct hydraulic servo, a rack and pinion system driven by an electric motor, a lead screw type system driven by an electric stepper motor, a linear DC servo, or an endless steel tape driven by an electric servo motor.

In operation, the track selecting means 43 produces a track selection signal which is indicative to the track which is desired to be written, read, or erased. Signal comparing means 42 compares signal from interferometer means 40 with the track selection signal and the servo control signal produced by signal comparing means 42 is indicative of the difference of the two signals. Second motor means 44 moves movable arm means 30 toward the desired position. As the position of movable arm means 30 changes, the electrical signal produced by interferometer means 40 changes, and therefore the servo control signal also changes. When movable arm means 30 is positioned such that light beam 21 is directed to the desired track, the electrical signal from interferometer means 40 equals the track selection signal and the servo control signal is zero.

It can be seen that with the system of the present invention, the precise tracking required for an optical mass memory is achieved. For example, in an optical mass memory system using a circular disc substrate having a diameter of 15 cm and rotating at a rate of 10 revolutions per second, bits of 1.5 micron in diameter are recorded in tracks. The spacing between adjacent tracks is 3 microns. In such a system, the tracking error must be less than 0.125 microns. When the light source of interferometer means 40 is a helium-neon laser operating at a wavelength of 6,328A., positioning is achieved to within 0.079 microns.

It can be seen that the system of the present invention provides accurate tracking which is independent of the memory medium 11. In addition, the system can tolerate an eccentricity of 25 microns in the disc when the disc rotational speed is 10 revolutions per second. The eccentricity can be tolerated since interferometer means 40 measures the relative path difference between reflective surface 35 and reflective edge surface 10*b*.

In practice, the signal derived by interferometer means 40 from the interference fringes formed by light beams 41*a* and 41*b* is a digital signal. A bidirectional interference fringe counting means counts the number of interference fringe maxima and minima from a previously designated reference fringe. The digital signal from the fringe counting means is then converted to an analog signal by a digital-to-analog converter.

Similarly, the desired track is generally designated by the digital signal. Therefore, track selecting means 42, which ordinarily is a portion of the central controller for the memory, includes a digital-to-analog converter which insures that the track selection signal is an analog electrical signal.

Figure 2:
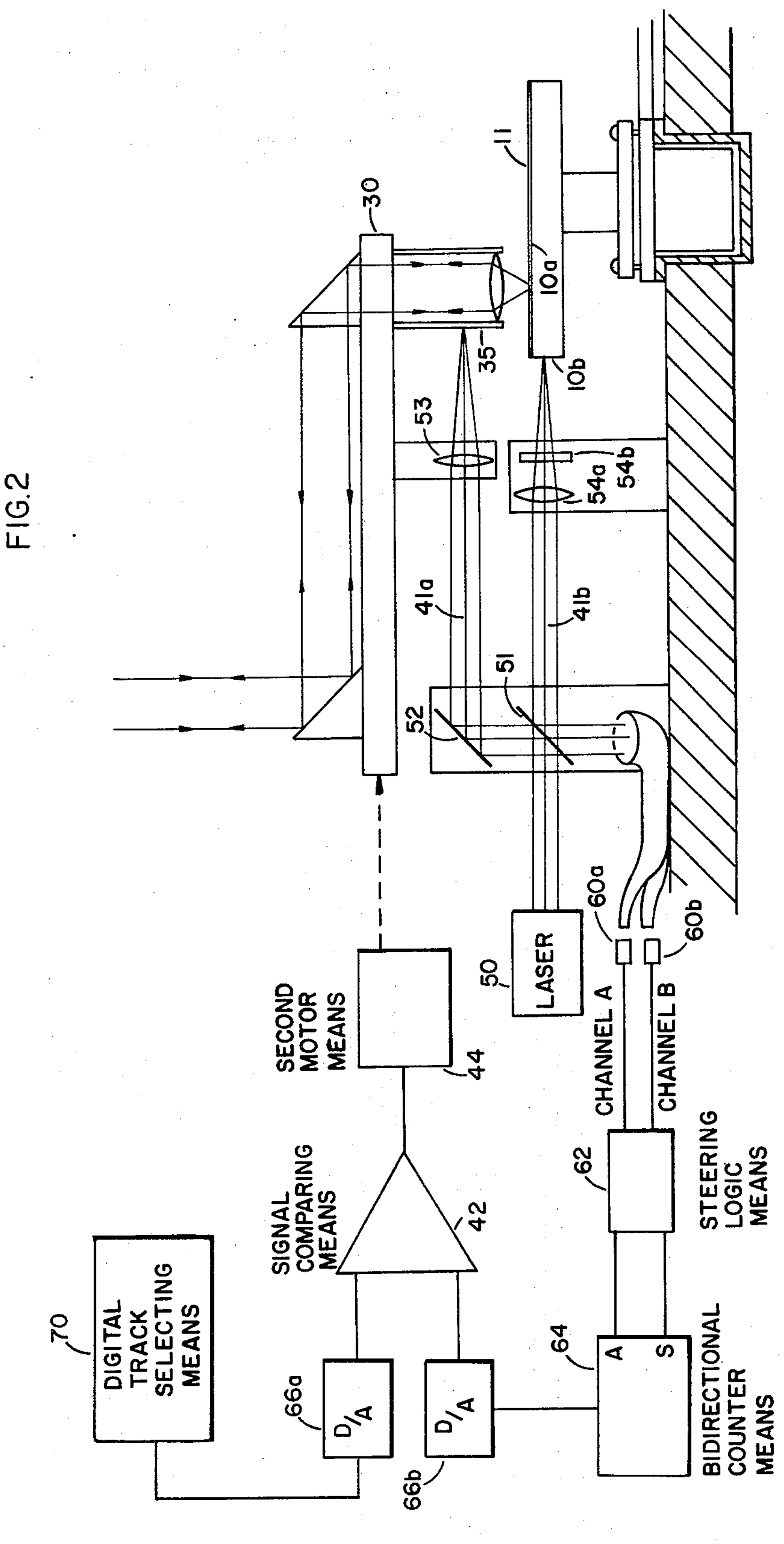
FIG. 2 shows a preferred embodiment of the servo system of the optical mass memory.

FIG. 2 shows a highly advantageous embodiment of the optical memory system of the present invention. The system of FIG. 2 is similar to that of FIG. 1 and similar numerals are used to designate similar elements.

Laser 50 produces a monochromatic light beam 41 which is split by beam splitter 51 into first and second light beams 41*a* and 41*b*. First and second light beams 41*a* and 41*b* traverse first and second paths, respectively. The first path terminates with reflective surface 35 such that first light beam 41*a* is reflected back to beam splitter means 51 over the first path. The second path terminates with the reflective edge surface 10*b* such that second light beam 41*b* is reflected back to beam splitter means 51 over the second path. Mirror 52 is positioned in the first path to direct first light beam 41*a* toward reflective surface 35 and thereby cause the first and second paths to be parallel to one another.

First lens means 53 is mounted on movable arm means 30. First lens means 53 focuses first light beam 41*a* to a first focused light spot at reflective surface 35. In this manner, first lens means 53 and reflective surface 35 form a first catadioptric mirror. A catadioptric mirror is a combination of a plane mirror and a lens.

Second lens means in the form of convex lens 54*a* and cylindrical lens 54*b* is positioned in the second path for focusing second light beam 41*b* to a second focused light spot at the reflective edge surface 10*b*. Cylindrical lens 54*b* compensates for the curvature of reflective edge surface 10*b*, thereby reducing distortion of the interference fringe pattern. It can be seen that in an optical memory system using a cylindrical drum substrate rather than a circular disc substrate, the reflective edge surface is not curved and therefore cylindrical lens 54*b* is not needed. The combination of the second lens means and reflective edge surface 10*b* form a second catadioptric mirror.

Beam splitter 51 recombines first and second light beams 41*a* and 41*b* after they have been reflected from reflective surface 35 and reflective edge surface 10*b* respectively. The recombined light beam has an interference fringe pattern therein. Whenever the optical path difference ($n$L) between the first and second paths differs by an integral number of one-half wavelengths, the central pattern of the interference fringe pattern is either bright or dark, depending upon whether the first and second light beams 41*a* and 41*b* return to the beam splitter 51 in or out of phase. The intensity of the fringe pattern is given by $$I = A^2(1 + \mu \cos \alpha),$$

where $A$ is the electric field amplitude, $\alpha$ is the phase angle between the waves and $\mu$ = the visibility function. The visibility function is defined as $$\mu = I_{max} - I_{min} / I_{max} + I_{min}.$$

$I_{max}$ is the intensity of a light fringe and $I_{min}$ is the intensity of a dark fringe.

With proper adjustments, the interference fringe pattern is a circular fringe pattern having two interference fringes. As reflective surface 35 is moved toward beam splitter 51, the fringes appear to move to the center of the pattern and disappear. When reflective surface 35 is moved away from beam splitter 51, the fringes appear to be created at the center of the pattern and move outward.

In the present invention, the fringes must not only be counted, but the direction of motion of the fringes must be determined so that the actual position of reflective surface 35 with respect to reflective edge surface 10*b* can be determined.

The number of fringes and their direction of motion is determined by arranging two photodetectors to view parts of the fringe pattern where the variations of light intensity resulting from the moving fringes are out of phase by approximately 90°. This is achieved by phase splitter means which splits the recombined light beam into a first and a second portion, the first and second portions being separated in phase by 90° in the interference fringe pattern. As shown in FIG. 2, a fiber optic bundle acts a phase splitter means. However, other phase splitter means such as a phase splitter mirror are well known in the art. The signals from first and second detectors 60*a* and 60*b* are received by steering logic means 62, which generates a pulse for each fringe maximum or minimum from each detector. In addition, steering logic means 62 senses the phase difference between the signals from detectors 60*a* and 60*b*. The sign of the phase difference is indicative of the direction of motion of the interference fringes and therefore is indicative of the direction of relative motion of the reflective surface 35 with respect to the reflective edge surface 10*b*. Steering logic means 62 directs the electrical pulses to either the add or the subtract channel of bidirectional counter means 64, depending upon the sign of the phase difference.

Bidirectional counter means 64 receives the electrical pulses from steering logic means 62 and produces a digital electrical signal which is indicative of the number of fringes from a predetermined reference fringe. The digital electrical signal produced by bidirectional counter means 64 is then converted to an analog electrical signal by first digital-to-analog converter 66*a*.

Digital track selecting means 70 produces a digital track selection signal which is indicative of the desired distance between reflective edge surface 10*b* and reflective surface 35. Second digital-to-analog converter 66*b* converts the digital track selection signal to an analog track selection signal. Signal comparing means 42 receives the two signals and produces a servo control signal indicative of the difference of the analog signal from the interferometer and the track selection signal. Second motor means 44 positions movable arm means 30 in response to the servo control signal.

The major requirement on laser 50 is that it must operate in a single longitudinal and transverse mode if the optical path difference is greater than about 5 cm. For a helium-neon laser operating at 6,328A., this requirement sets a cavity length limitation of about 10 centimeters, since the longitudinal mode separation is given by $\Delta\gamma = c/2$L, and $\Delta\gamma$ for the neon line is approximately 1,500 Hz. One laser which meets these requirements is the Spectra Physics Model 119 laser. This laser has a drift of less than ± 75 mHz per day and an output power which is in excess of 100 microwatts.

The accuracy of the relative position of surfaces 35 and 10*b* depends directly upon the stability of laser 50. A change of two parts per million in the laser cavity length results in a change of wavelength of one part per million since the laser resonant condition is $$\eta\lambda = 2L,$$

where $\eta$ is the number of standing waves in the cavity, $\lambda$ is the wavelength, and $L$ is the cavity length.

As long as the change in length is such that $\Delta L$ is less than a wavelength, $\eta$ remains constant and the wavelength $\lambda$ changes. Therefore, excellent mechanical stability is an essential requirement for laser 50.

The accuracy of the system also depends upon light beam 41 being monochromatic. If light beam 41 contains two wavelengths, the two wavelengths simultaneously interfere with each other. The fringe pattern disappears when one wavelength has a maximum at a point of minimum of the other wavelength. If the laser has two longitudinal modes, the fringe pattern disappears at multiples of the cavity length. Between these points it will tend to pull the phase of the fringe pattern and shift the count point. If the two wavelengths have differing intensity, there is always a fringe pattern, but it is modulated in intensity by the changing visibility function. Therefore, it is highly advantageous for laser 50 to operate in a single mode.

The laser alignment requirements are considerably relaxed if one of the cavity mirrors is concave instead of flat. This makes the output of the laser a diverging beam. For the Spectra Physics Model 119 laser, a lens of 14.3 centimeter focal length is necessary to collimate light beam 41. The lens should be of λ/10 or better optical quality in the region through which light beam 41 passes. The lens should be mounted within 1 centimeter of the laser housing and made adjustable to ± 0.5 cm to allow for easy adjustment of the collimation of light beam 41.

Beam splitter 51 is preferably a mirror with a thin 40–60 percent transmitting aluminum or silver coating. A 2.5 cm diameter homosil quartz flat with a flatness of 1/20 wave on both sides and a thickness of 4 millimeters has been found to be satisfactory. Beam splitter 51 is set at 45° ± 1 minute to the central axis of light beam 41.

Lens 53 preferably has a focal length as short as practical to minimize the effects of thermal expansion. The focal length of lens 53 and therefore the radius of light beam **41*a*** determines the number of interference fringes in the interference fringe pattern. As described previously, is highly desirable that the interference fringe pattern be circular with two interference fringes.

Lens **54*a* must have a depth of field which is greater than or equal to the variation in location of reflective edge surface 10*b*. In other words, the depth of field of lens 54*a* must be greater than or equal to the amount of eccentricity of circular disc substrate 10. The depth of field of lens 54*a*** is given by $$D \cong \lambda \sqrt{1=(NA)^2}/NA^2,$$

where $$NA = d/2FL,$$

$d$ = diameter of light beam **41*b*, and $FL$ = focal length of lens 54*a***.

As stated previously, cylindrical lens **54*b* is selected to compensate for the curvature in reflective edge surface 10*b***.

The tracking system of the present invention places grinding and polishing requirements on reflective edge surface **10*b*. Any roughness or waviness in surface 10*b* appears as noise in the tracking system. In the previously discussed example of a 15 cm diameter disc rotating at 10 revolutions per second, the noise produced by roughness or waviness in reflective edge surface 10*b* must not interfere with the positioning to a tolerance of 0.125 microns. Therefore, the grinding and polishing of the reflective edge surface must be to less than 0.08 microns. Grinding and polishing to less than 0.03 microns is preferred. The finished reflective edge surface must be cylindrical to within 3 microns and contain no more than four cycles of waviness around the circumference. To insure satisfactory servo performance, the disc substrate 10 must be centered on air bearing 14** to within 25 microns.

Figures 3, 4A, 4B:
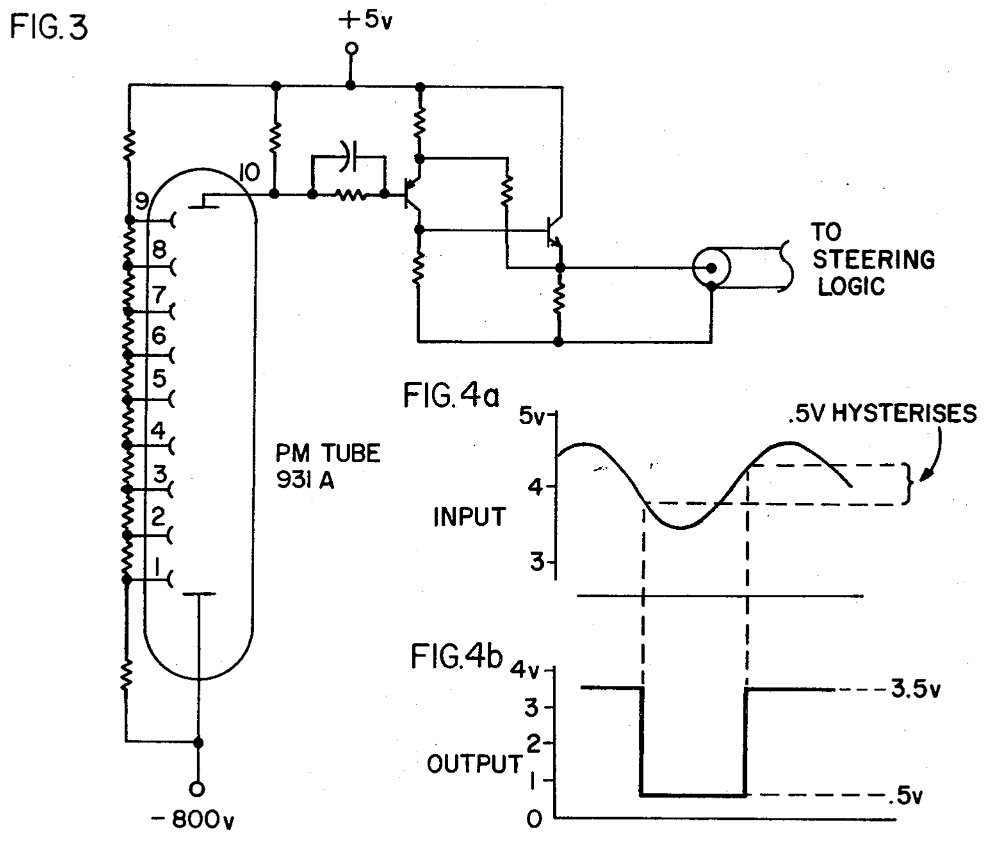
FIG. 3 shows one embodiment of photodetector means.
FIGS. 4*a* and 4*b* show waveforms produced by the photodetector means of FIG. 3.

FIG. 3 shows one possible embodiment of detector means **60*a*. Detector 60*b* is identical to detector 60*a*** and therefore only one detector is shown. The optical sensor is an RCA 931A photomultiplier. FIG. 4*a* shows a typical output signal from the photomultiplier tube as a function of motion of reflective surface 35. Typically the optical sensor is connected to a wave shaping circuit which changes the essentially sinusoidal output of the photomultiplier to a square wave such as shown in FIG. 4*b*. As shown in FIG. 3, one highly advantageous wave shaping circuit is the Schmitt trigger. In the circuit shown in FIG. 3, the Schmitt trigger has about 0.5 volts hysteresis which is used to square the signal and discriminate against noise. FIG. 4*b* represents the output of the wave shaping circuit. The output from the wave shaping circuit of detector **60*a* is directed to steering logic means 62 through channel A. Similarly, the output of the wave shaping circuit of detector 60*b* is directed to steering logic means 62** through channel B.

Figure 5:
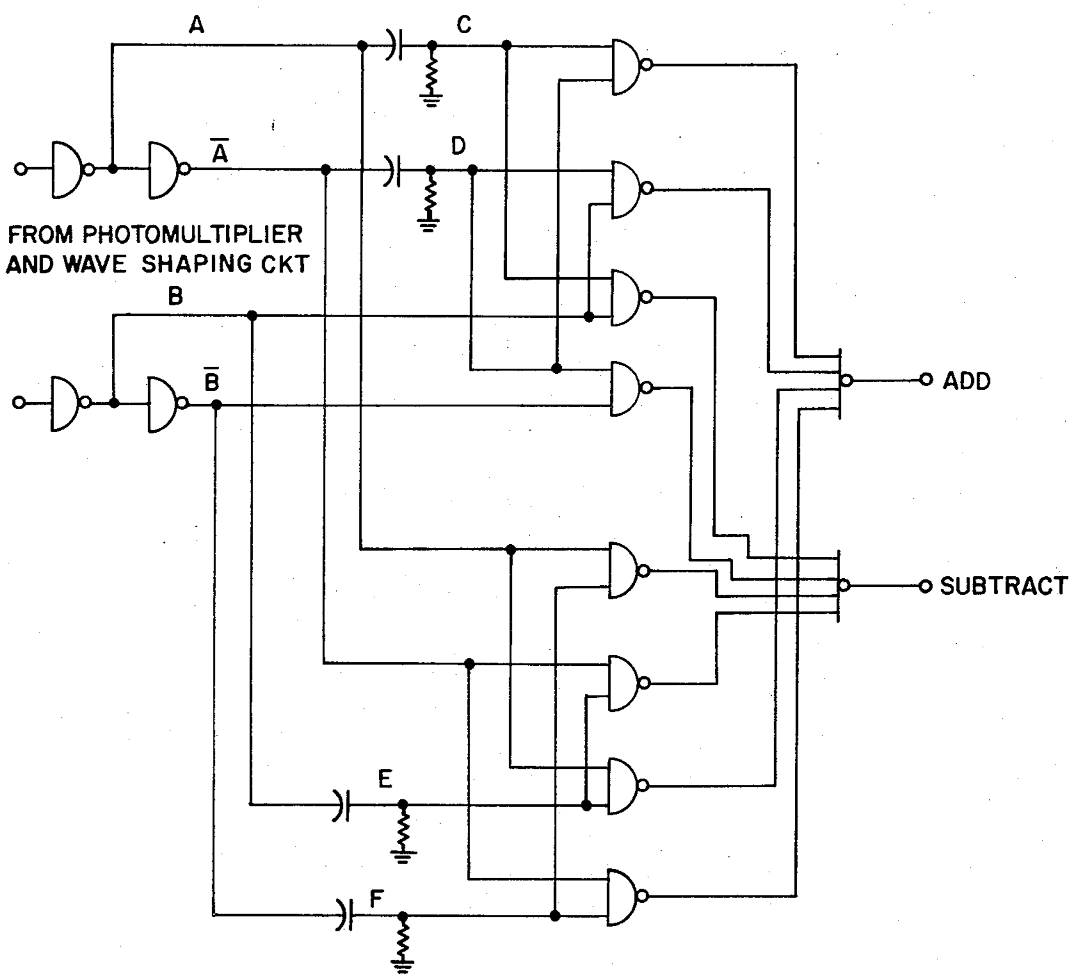
FIG. 5 shows the logic diagram for one embodiment of steering logic means.

FIG. 5 shows the logic diagram for one possible embodiment of steering logic means 62. The purpose of steering logic means 62 is to produce a pulse for each fringe maximum and minimum and to direct the pulse to either the add or subtract channel of bidirectional counter means 64, depending upon the direction of motion of reflective surface 35 with respect to reflective edge surface **10*b***. The signal from channel A is designated as the reference signal. The signal from channel B is compared to the signal from channel A, thereby allowing the direction of motion to be determined.

Figure 6:
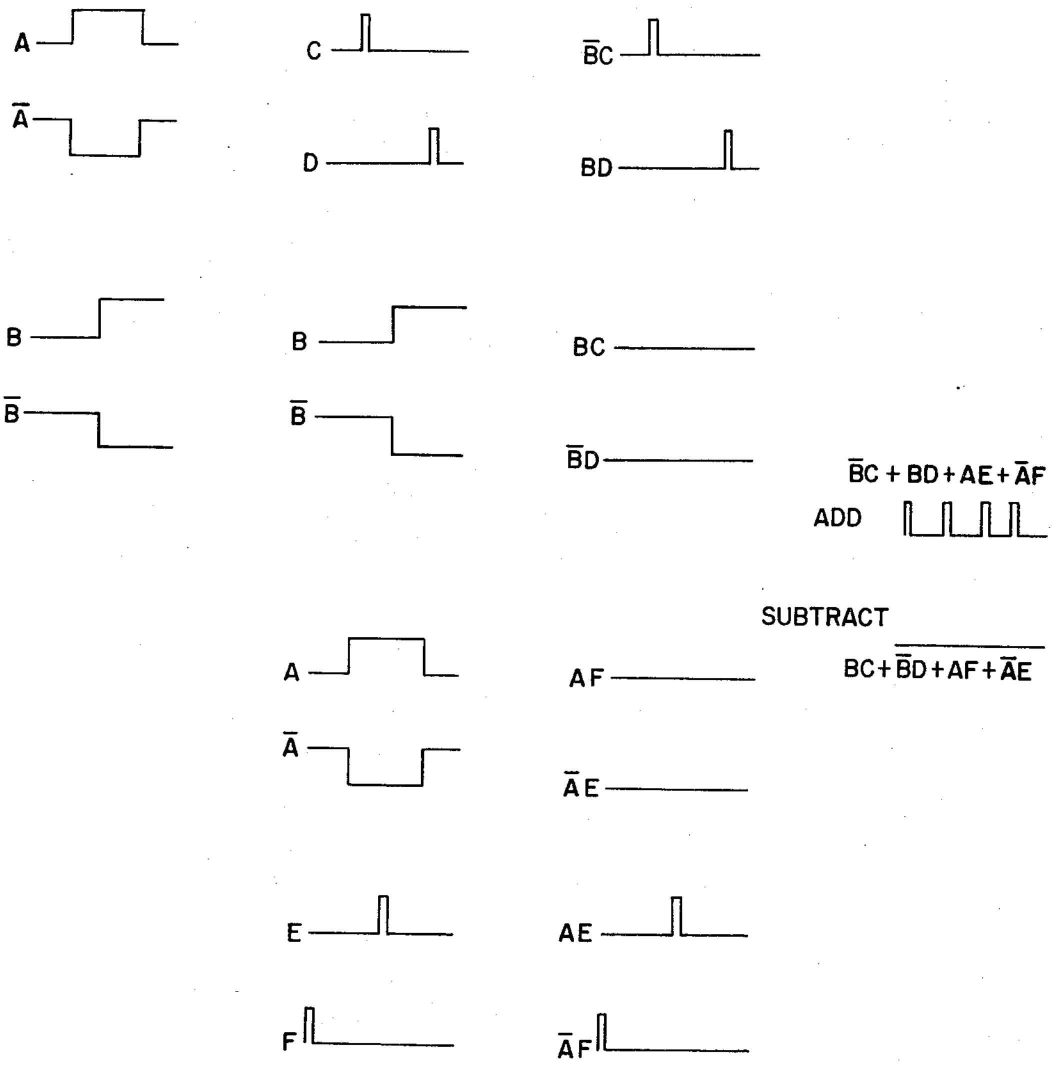
FIGS. 6 and 7 shows the signals produced by the steering logic means of FIG. 5.

FIG. 6 shows the signals produced by the steering logic of FIG. 5 when the optical path difference between reflective surface 35 and reflective edge surface **10*b* is increasing. Signals A, $\bar{A}$, B, and $\bar{B}$ are differentiated by RC circuits to produce signals C, D, E, and F respectively. It can be seen that for one cycle of the wave forms produced by detectors 60*a* and 60*b* four successive pulses are produced which are directed to either the add channel or the subtract channel of bidirectional counter means 64. As shown in FIG. 5, the four pulses are directed to the add channel. This is the result of an arbitrary designation of motion of reflective surface surface 35** toward the center of the disc as motion in the "positive" direction.

Figure 7:
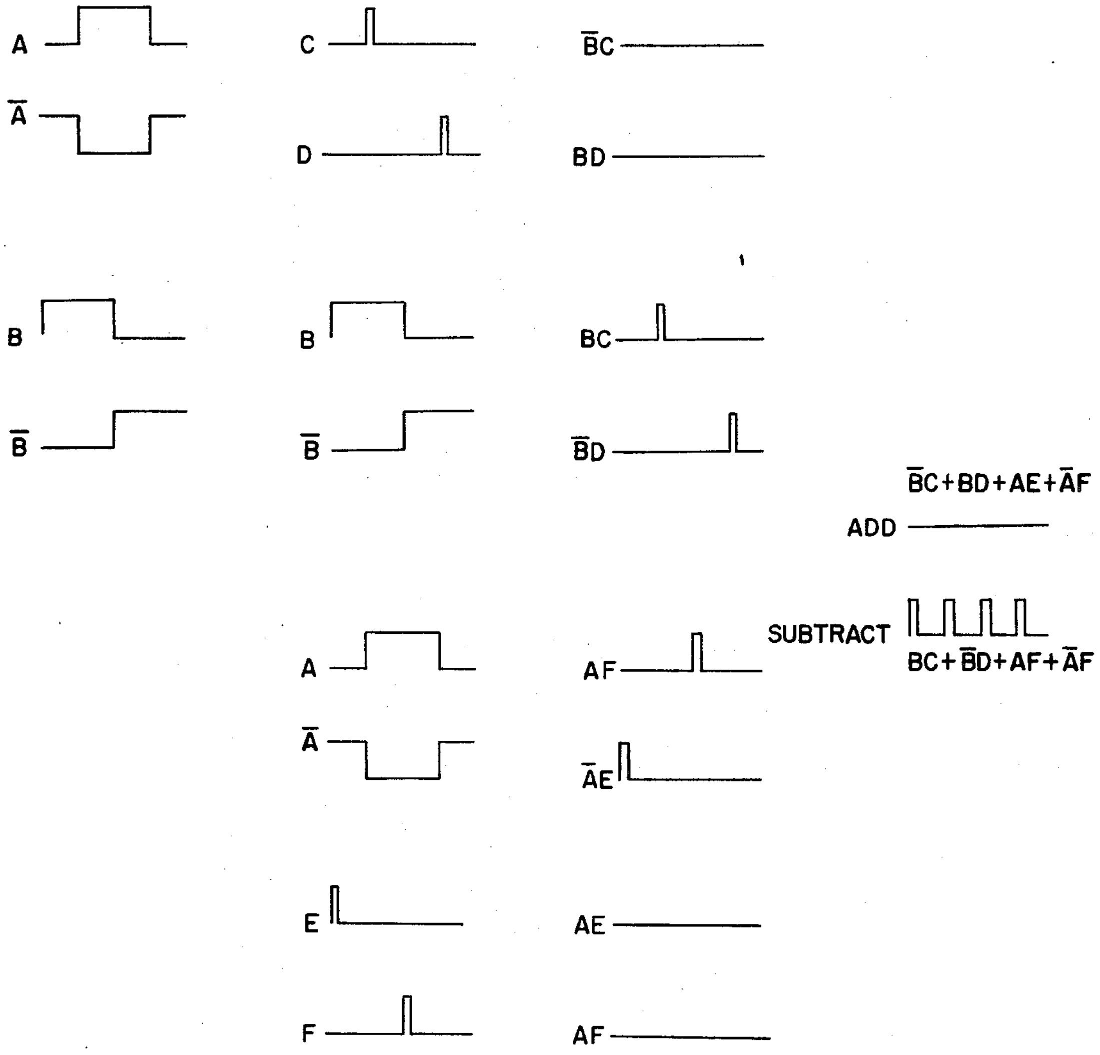

FIG. 7 shows the signals produced by the steering logic of FIG. 5 when reflective surface 35 is moving in the "negative" direction. For one cycle of the wave forms produced by detectors **60*a* and 60*b*, four pulses are directed to the subtract channel of bidirectional counter 64** and no pulses are directed to the add channel.

In one preferred embodiment of the present invention, bidirectional counter means 64 is a Beckman Instruments Model 6013 bidirectional counter. When the Model 6013 bidirectional counter is used, the pulses produced by steering logic means 62 are preferably in excess of 1.5 volts, which is ample for triggering the counter.

While specific detector means, steering logic means, and bidirectional counter means have been described, it is to be understood that alternative detectors, steering logic means, and bidirectional counter means may be used. Examples of such alternative means are described by E. R. Peck and S. W. Obetz in *Journal of the Optical Society of America*, Volume 43, Number 6, page 505, June 1953; and by H. D. Crook and L. A. Marzetta in the *Journal of Research of the National Bureau of Standards* — C. Engineering and Instrumentation, Volume 65C, Number 2, page 129, April – June 1961.

The fringes that are counted represent units of optical path length. This is because the wavelength of light in a medium depends upon the index of refraction. True length is given by $$L = N \cdot \lambda_s [1 + \{A - Bh/1 + \alpha T + C(f - 7)\} 10^{-6}],$$

where $N$ = Number of fringes counted $\lambda_s$ = 1/4 wavelength at STP = $15.8208068 \times 10^{-6}$ cm $A = 273.870$ $B = 0.386834$ $h$ = Barometric pressure in mm $\alpha = 0.003674$ $T$ = Temperature in °C $C = 0.04940$ $f$ = Water vapor pressure in mm.

Figure 10:
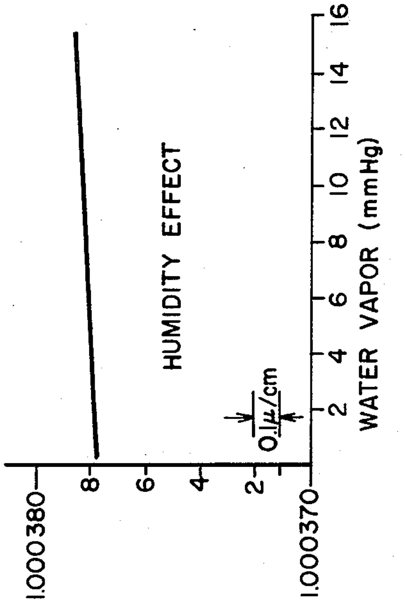
FIGS. 8, 9, and 10 show length as measured by the interferometer as a function of pressure, air temperature, and humidity, respectively.
Figure 9:
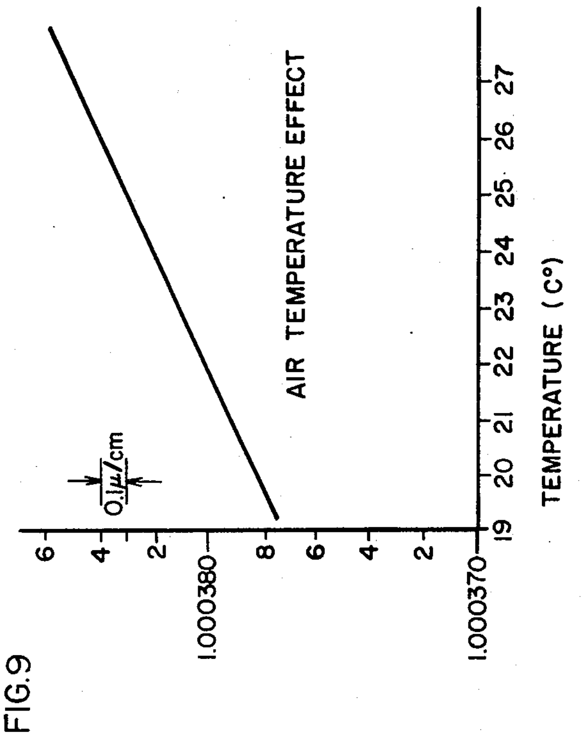
Figure 8:
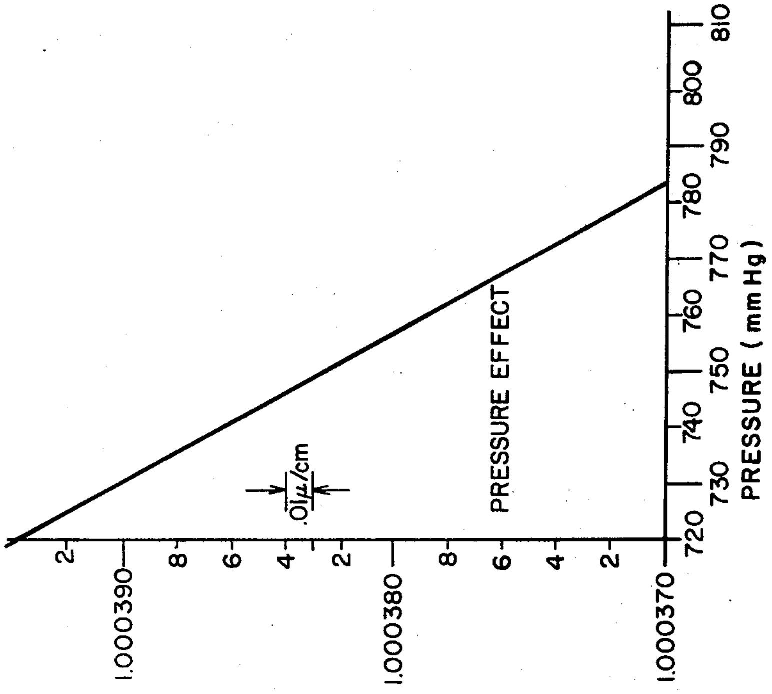

Therefore, the accuracy of the measurement by the interferometer is dependent upon pressure, temperature, and humidity. FIGS. 8, 9, and 10 show the length measurement as a function of pressure, air temperature, and humidity, respectively. From FIG. 10 it can be seen that effects due to humidity are insignificant. The temperature correction is approximately 0.01 micron per cm per °C. Similarly, the pressure correction is approximately 0.04 micron per cm per cm of mercury. Therefore, temperature and pressure corrections are required if temperature varies more than ± 2.5° C and pressure varies more than ± 0.6 cm of mercury.

The inaccuracies produced by variations in temperature or pressure can be corrected for in a number of ways. First, the optical memory may be maintained in a controlled environment in which temperature varies by less than ± 2.5° C and pressure varies by less than ± 0.6 cm of mercury. Alternatively, temperature and pressure sensors can be used to provide indications of variations in temperature and pressure. A correction signal is produced and fed into the servo system to negate any inaccuracies due to the changes.

As discussed previously, a large number of alternatives are available for second motor means 44. In the optical memory system of this invention, it is desirable to maximize the resonant frequency of the servo system and to minimize the backlash and mechanical friction in the system. These objectives are best accomplished when second motor means 44 is linear DC servo motor. A high current drive amplifier is required if a linear DC servo motor is used.

Figure 11:
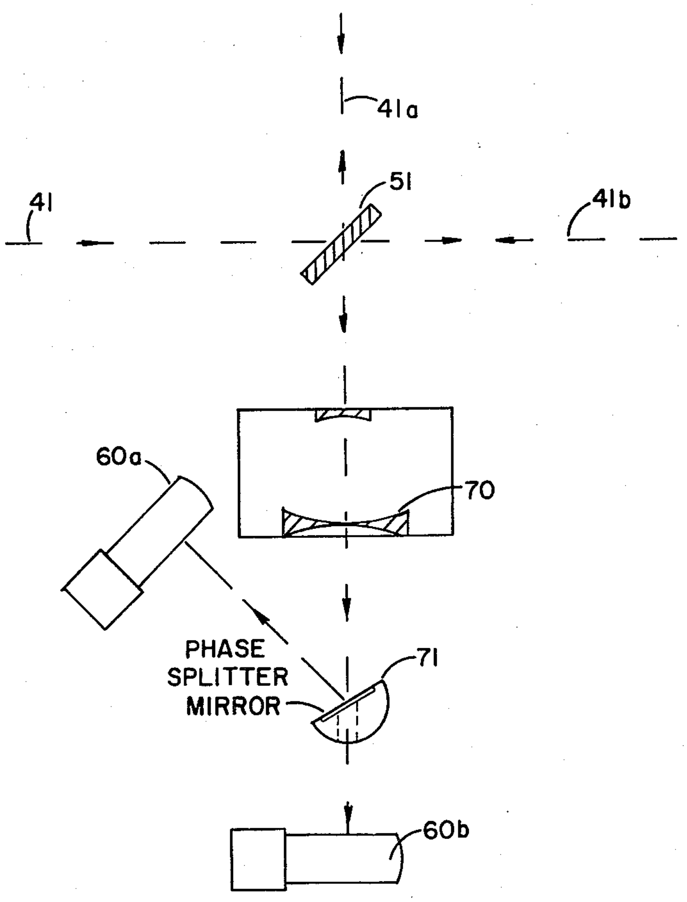
FIG. 11 shows an alternative embodiment of phase splitting means.

FIG. 11 shows another embodiment of the phase splitting means. A diverging lens 70 of about minus 5 centimeter focal length is situated about 5 cm from beam splitter 51 to expand the recombined light beam. An adjustable phase splitter mirror 71 with a transparent spot in the aluminum coating is situated about 5 cm behind diverging lens 70 and at an angle of about 22½° to the light beam. Light from the central portion of the fringe pattern passes through the hole to detector **60*b* while the outer portion of the fringe pattern is reflected to detector 60*a***.

The phase splitter mirror 71 is made by evaporating aluminum onto a 1 cm by 2.5 cm microscope slide. The aluminum coating can be readily removed. This provides one way of locating and forming the hole in the aluminum coating. While the fringe pattern is reflected onto a paper screen, that portion of the aluminum coating can be removed which shows up as a dark spot in the center of the pattern. An aperture in a bracket mounted on the phase splitter mirror fixture can be moved along the diverging beam to set the 90° phase shift between the two detector signals.

It is to be understood that this invention has been disclosed with reference to a series of preferred embodiments and it is possible to make changes in the form and detail without departing from the spirit and scope of the invention.

The embodiments of the invention in which an exclusive property or right is claimed are defined as follows:

1. An optical memory comprising:

a rotatable substrate having a memory surface and a reflective edge surface essentially orthogonal to the memory surface, a memory medium attached to the memory surface of the rotatable substrate and capable of having a plurality of tracks of bits of information recorded thereon, first motor means for rotating the substrate and the memory medium, movable arm means extending over the memory surface, the movable arm means being capable of motion in a direction essentially parallel to the memory surface and essentially orthogonal to the reflective edge surface, light source means for producing a light beam for reading and writing on the memory medium, final lens means for focusing the light beam to a focused light spot on the memory medium, final lens mounting means for mounting the final lens means to the movable arm means, a reflective surface attached to the movable arm means, interferometer means for measuring the relative distance between the reflective edge surface and the reflective surface and producing an electrical signal indicative of the relative distance, track selecting means for producing a track selection signal indicative of the desired distance between the reflective edge surface and the reflective surface, signal comparing means for receiving the electrical signal and the track selection signal and for producing a servo control signal indicative of a difference of the electrical signal and the track selection signal, and second motor means for positioning the movable arm means in response to the servo control signal.

2. The optical memory of claim 1 wherein the rotatable substrate is a circular disc having a planar memory surface and a curved reflective edge surface.

3. The optical memory of claim 1 wherein the rotatable substrate is a cylindrical drum.

4. The optical memory of claim 1 wherein the interferometer means comprises:

interferometer light source means for directing a first interferometer light beam to the reflective surface and a second interferometer light beam to the reflective edge surface, beam combining means for receiving the first and second interferometer light beams from the reflective surface and the reflective edge surface and for combining the first and second interferometer light beams to produce an interference fringe pattern, interference fringe counting means for counting the number of interference fringe maxima and minima from a predetermined reference fringe, and for producing a digital signal indicative of the number, and first digital-to-analog converter means for converting the digital signal to an analog electrical signal.

5. The optical memory of claim 4 wherein the track selecting means comprises:

digital track selecting means for producing a digital track selection signal indicative of the desired distance between the reflective edge surface and the reflective surface, and second digital-to-analog converter means for converting the digital track selection signal to an analog track selection signal.

* * * * *